United States Patent Office 3,253,937
Patented May 31, 1966

3,253,937
TALL OIL PITCH SIZE AND ITS PREPARATION AND USE
Joseph H. Stump, Jr., Pensacola, Fla., assignor, by mesne assignments, to Tenneco Chemicals, Inc., a corporation of Delaware
No Drawing. Filed Nov. 28, 1961, Ser. No. 155,448
12 Claims. (Cl. 106—123)

This invention relates to the sizing of paper and other water-laid cellulose webs, relates to a novel size for paper derived from tall oil pitch and relates to the production of the novel size and its use.

It is known that rosin including tall oil rosin can be used in the preparation of paper sizes. However, it also is known that tall oil cannot be used in the production of sizes as tall oil contains a high percentage of fatty acids which are converted to sodium or potassium soaps upon saponification in the production of the size. The presence of these fatty acid soaps in sized paper renders the paper susceptible to liquid penetration.

It has been discovered that tall oil pitch upon reaction with a small amount of formaldehyde can be converted to an effective size for water-laid cellulose webs, despite the fact that unmodified tall oil pitch containing a substantial amount of fatty acids is not an acceptable sizing material. It has been found that when the formaldehyde-tall oil pitch is converted to size and applied in paper making, the resulting paper or other water-laid cellulose webs are resistant to penetration by liquids, including water and ink. The resistance of the paper to liquid penetration is much greater than that of paper similarly sized with tall oil pitch not reacted with formaldehyde. The amount of formaldehyde reacted with the tall oil pitch may be in the range of ½% to 10% by weight of the pitch although the preferred amount of formaldehyde is in the range of 1% to 6% by weight of the tall oil pitch. While a half percent of formaldehyde will produce an effect, a pronounced effect is produced by as little as 1%. About 6% formaldehyde produces the maximum effect. The optimum amount of formaldehyde is in the range 2–4% by weight of the pitch.

The formaldehyde may be added to the tall oil pitch as such, either as gaseous formaldehyde or as a liquid solution or it may be formed in situ by the addition of a formaldehyde polymer such as trioxane, paraformaldehyde, etc., which will depolymerize to produce or liberate formaldehyde. The paraformaldehyde may, for example, be added dissolved in a solvent.

The tall oil pitch used in the reaction with formaldehyde is a dark, usually black, viscous material produced as a by-product during the separation of fatty acids and rosin acids from crude tall oil. Any of these tall oil pitches may be used although they vary to some extent depending upon tall oil from which they are separated. Most tall oil pitch is separated by distillation of crude tall oil under partial vacuum, to separate refined tall oil from the tall oil pitch which collects in the bottom of the still. Usually this pitch will contain at least three times as much unsaponifiable material as the crude tall oil. In addition, tall oil pitch collects as a residue in the bottom of stills when separating rosin acids in relatively pure form from refined tall oil or a tall oil fraction containing fatty acids and some unsaponifiable material in addition to rosin acids. Tall oil pitch contains considerably more unsaponifiable (non-acids) than tall oil. In the analysis of tall oil, it is customary to determine the percent by weight of rosin acids, fatty acids and unsaponifiable material which is the remainder. This remainder or balance is a complex mixture of sterols and other higher alcohols as well as some hydrocarbons. In tall oil pitch some of the balance which is neither free fatty acids or rosin acids as such, may be esters, probably esters of some of the alcohols and fatty acids. If these esters, which are not free acids, are present, they are included in the balance. In general, these tall oil pitches will contain the following proportions of materials:

|  | Percent |
|---|---|
| Rosin acids | 10–45 |
| Fatty acids | 10–55 |
| Balance | 25–80 |

The formaldehyde is reacted in any suitable manner with the tall oil pitch until there is no free formaldehyde present. Heating is desirable to promote the complete reaction of the formaldehyde with the pitch and quite high temperatures may be used as long as there is no substantial degradation of the reactants. While it is not clear what chemical reaction or reactions take place, there is no material difference in the products obtained at different temperatures. Usually the reaction will be carried out in the range of 100–300° C. If desirable, completion of the reaction can be determined by testing for the presence of unreacted formaldehyde.

The sizes are prepared by saponifying the formaldehyde pitch reaction product in substantially the same manner as rosin sizes are prepared from rosin. The formaldehyde-pitch reaction product preferably is heated to lower its viscosity and mixed with an aqueous alkaline solution of an alkali metal compound, usually an aqueous solution of sodium or potassium hydroxide, soda ash or a mixture thereof. The amount and concentration of the alkaline solution is predetermined so that the saponification product contains from about 60 to 80% sizing solids by weight. The amount of alkaline solution should be such that size having an acid number below 10 and preferably below 5 is obtained so that there is no substantial amount of free acid present. If desirable, the size can be dried for storage.

The novel size of the present invention is used in the same manner as ordinary rosin size by adding a dilute aqueous solution of the size to an aqueous suspension of paper-making cellulose fibers, precipitating the size on the fibers by alum, sheeting the fibers to form a web, and drying the web to form paper. The amount of size used may be varied widely depending on the results desired but usually will be added in amounts between about ¼% and about 5% of size, but usually in amounts between ½% and 4% of size, based on the weight of dry pulp. The amount of alum added may vary from ½% to 5% but usually will be from about 1% to 2% by weight of the dry pulp.

The following examples are given for purposes of illustration. All parts and percentages are by weight.

EXAMPLE 1

Four batches of tall oil pitch and different amounts of paraformaldehyde were gradually heated with agitation to 150° C. over a period of one hour, then to 200° C. over a period of one hour, and held at 200° C. for two hours, a total of four hours, when the pitch-formaldehyde chemical reaction was complete. The following proportions of pitch and paraformaldehyde were used:

|  | Pitch, Parts | Paraformaldehyde, Parts |
|---|---|---|
| No. 1 | 100 | 1 |
| No. 2 | 100 | 2 |
| No. 3 | 100 | 4 |
| No. 4 | 100 | 6 |

The tall oil pitch used was a commercially available product having the following analysis:

| | Percent |
|---|---|
| Rosin acids | 15 |
| Fatty acids | 12 |
| Balance: | |
|     Unsaponifiable | 27 |
|     Esters | 46 |

Acid No. 50.
Saponification No. 120.

The four reaction products were heated and mixed with water and sufficient NaOH to almost neutralize the free acidity of the pitch-formaldehyde reaction product. The resulting pastes each contained 70% solids with acid numbers of 1.5 to 3.0. These sizes will be hereinafter referred to as sizes Nos. 1, 2, 3 and 4, respectively, with each size being made from the pitch-formaldehyde reaction product of like number.

EXAMPLE 2

A size was made from the untreated tall oil pitch of Example 1 by heating the pitch and an aqueous sodium hydroxide solution in a predetermined amount such that the resulting size had an acid number 2.1 and contained 70% solids. This size is hereinafter referred to as "size No. 5."

EXAMPLE 3

A 100 parts of the tall oil pitch as described in Example 1 was heated with 4 parts of maleic anhydride for one hour. The resulting reaction product was heated with an aqueous solution of NaOH to produce a size containing 71% solids having an acid number 4.2. This size is referred to as "size No. 6."

EXAMPLE 4

Each of the sizes of the foregoing examples was tested in the same manner and in accordance with the same standard laboratory procedure hereinafter described. Bleached Kraft pulp was beaten to a Schopper-Riegler freeness of 325 cc. at a 2.5% consistency with water adjusted to pH 4.5 with sulfuric acid. To twelve hundred grams of the 2.5 consistency pulp under agitation there was added in increments diluted size and alum to size until the pulp was sized to a level of 2½% size and 1½% alum. Then final pulp was adjusted to pH 4.5 with sulfuric acid. All weights represent solids based on the dry weight of the fibers.

Paper hand sheets were made in a Noble and Wood handsheet machine using recycle water at pH 4.5 for dilution so that each 8 in. by 8 in. sheet weighed 2.5 gm. The sheets were pressed and dried under the same standard laboratory conditions and conditioned overnight at 70° F. and 50% relative humidity. The conditioned sheets were tested for water absorption by the Cobb Test, TAPPI Method Number T441M-60 with the results being expressed as grams water absorbed per square meter. The conditioned sheets also were tested for ink penetration on a Model 320-2 Fotosize Penetration Tester available from Thwing-Albert Instrument Company. An aqueous solution of Soluble Blue 2B Extra (National Aniline) was used. This tester is a null balance indicator of the amount of light reflected from the under surface of the paper sample before and after application of the penetrant. The measure of penetration is shown by the loss of reflectivity of the under surface. The results are expressed in seconds, the length of time required to reduce the reflectivity of the under surface a standard amount as measured by photoelectric cells. Thus, the longer the period, the greater the resistance is to liquid penetration. The results are set forth in the following table:

Table

| Size No. | Cobb Test, g./m.$^2$ | Liquid Penetration, Sec. |
|---|---|---|
| 1 (1% HCHO) | 26 | 1213 |
| 2 (2% HCHO) | 22 | 1264 |
| 3 (4% HCHO) | 22 | 1289 |
| 4 (6% HCHO) | 22 | |
| 5 (0% HCHO) | 31 | 408 |
| 6 (4% mal. anh.) | 27 | 596 |

It will be noted that the sizes prepared from the formaldehyde modified pitch produce papers which are much more resistant to water absorption and liquid penetration than the sizes prepared from unmodified pitch or pitch modified with maleic anhydride. In fact it has been found that the formaldehyde-pitch sizes provide greater resistance to water absorption and liquid penetration than a common size prepared from B rosin and tested under similar conditions. A satisfactory size cannot be prepared from tall oil which essentially consists of fatty acids and rosin acids.

The present sizes can be used in combination with other sizes, for example, sizes made from rosin or modified rosin, when desirable. The present sizes also may be dried so that they can be stored.

I claim:

1. Paper size comprising the alkali metal saponification product of the material resulting from the reaction of tall oil pitch with from ½% to 10% of formaldehyde, based on the weight of the pitch.

2. Paper size comprising the alkali metal saponification product of the material resulting from the irreversible reaction of tall oil pitch with from 1% to 6% of formaldehyde, based on the weight of said pitch, said product having an acid number below 10.

3. Paper size comprising the alkali metal saponification product of the material resulting from the irreversible reaction of tall oil pitch with from 2% to 4% of formaldehyde, based on the weight of said pitch, said product having an acid number below 5.

4. A liquid tall oil pitch-formaldehyde size containing from 60–80% of size solids, said size solids being the sodium-saponification product of the material resulting from the reaction of tall oil pitch with from 1% to 6% by weight of formaldehyde, said product having an acid number below 10.

5. The process of modifying tall oil pitch to render it useful in the preparation of paper size comprising heating and reacting tall oil pitch with from ½% to 10% by weight of formaldehyde until all of said formaldehyde has reacted with said pitch.

6. The process of modifying tall oil pitch containing free rosin and fatty acids and at least 25% by weight of non-acids to render it useful in the preparation of paper size comprising heating and reacting tall oil pitch with from 1% to 6% by weight of formaldehyde until said quantity of formaldehyde has reacted with said pitch.

7. The process of modifying tall oil pitch to render it useful in the preparation of paper size comprising heating tall oil pitch to a temperature in the range of from 100° C. to 300° C. in the presence of 1% to 6% by weight of formaldehyde and continuing the heating until substantially all of said formaldehyde has reacted with said tall oil pitch, said formaldehyde being initially present as paraformaldehyde.

8. The method of manufacturing paper size comprising reacting tall oil pitch with from ½ to 10% by weight of formaldehyde, and saponifying the pitch-formaldehyde reaction product with an aqueous, alkaline solution of an alkali metal compound.

9. The method of manufacturing paper size comprising reacting tall oil pitch with from ½ to 10% by weight of formaldehyde, and saponifying the pitch-formaldehyde reaction product with sodium hydroxide in amount such that the saponification product has an acid number below 5.

10. The method of manufacturing paper size comprising reacting tall oil pitch containing free rosin acids and fatty acids with 1% to 6% by weight of paraformaldehyde until there is no free formaldehyde present, and saponifying substantially all of the free acids in the pitch-formaldehyde reaction product with sodium.

11. Modified tall oil pitch which is the fully reacted reaction product of tall oil pitch and from 0.5% to 10% by weight of formaldehyde based on the weight of the pitch.

12. Modified tall oil pitch which is the fully reacted reaction product of tall oil pitch and from 1% to 6% by weight of formaldehyde based on the weight of the tall oil pitch.

References Cited by the Examiner
UNITED STATES PATENTS

| | | | |
|---|---|---|---|
| 2,881,084 | 4/1959 | Watkins | 106—123 |
| 2,934,468 | 4/1960 | Strazdins | 162—180 |
| 2,941,919 | 6/1960 | Watkins | 162—180 |
| 3,009,820 | 11/1961 | Gould | 106—123 |

ALEXANDER H. BRODMERKEL, *Primary Examiner.*

MORRIS LIEBMAN, *Examiner.*

D. J. ARNOLD, *Assistant Examiner.*